R. FYFE.
Rotary Hog-Scrapers.

No. 140,409.

Patented July 1, 1873.

Witnesses:
E. Wolff
E. Sedgwick

Inventor:
R. Fyfe
PER
Attorneys.

UNITED STATES PATENT OFFICE.

ROBERT FYFE, OF NEW YORK, N. Y.

IMPROVEMENT IN ROTARY HOG-SCRAPERS.

Specification forming part of Letters Patent No. 140,409, dated July 1, 1873; application filed September 14, 1872.

*To all whom it may concern:*

Be it known that I, ROBERT FYFE, of the city, county, and State of New York, have invented a new and Improved Rotary Hog Scuttler and Scraper, of which the following is a specification:

My invention consists of a rotary scraper with blades adapted for scraping off the hair, bristles, &c., of scalded hogs, with handles by which to hold it when it is revolving, and a jointed driving-shaft worked by a pulley or other driving-gear.

Figure 1:
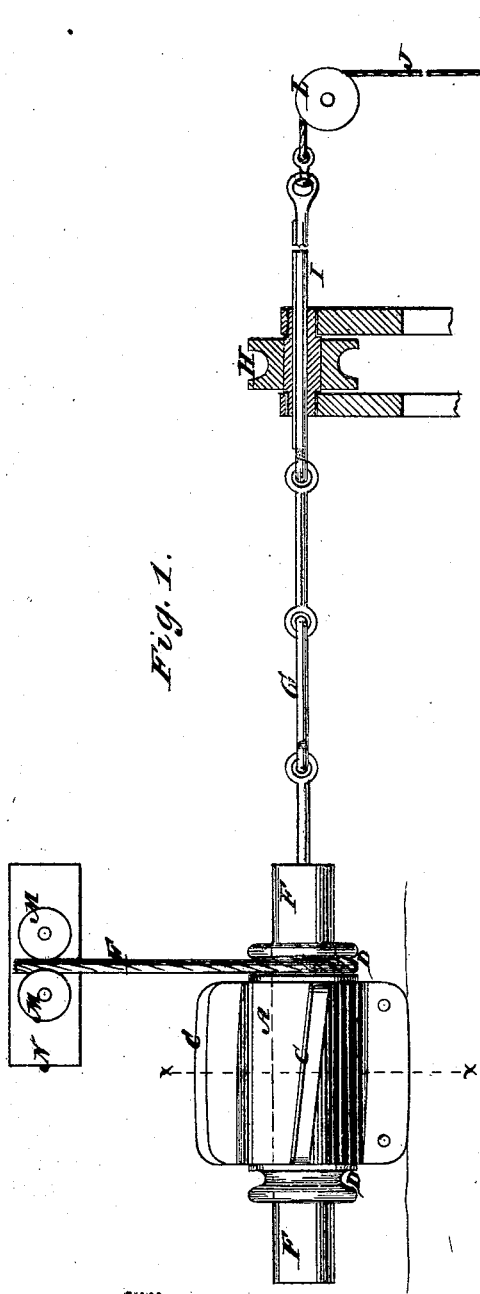
Figure 2:
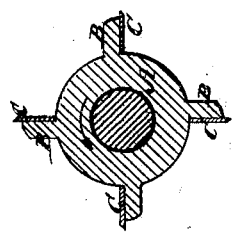

Figure 1 is a side elevation of a rotary scuttling or scraping tool such as I propose to employ, with one arrangement of apparatus that may be employed for working it partly shown in side elevation and partly in section; and Fig. 2 is a cross-section of Fig. 1 on the line $x\ x$.

Similar letters of reference indicate corresponding parts.

A is a roller of metal, wood, or other substance, with ribs B extending along the surface from end to end parallel with the axis, or spiral thereto, as may be preferred, and at equal distances apart, on which scraping-blades of steel, C, are fastened by bolts or screws, so as to be adjusted to set the edges relatively to the edges of the ribs, which are to serve as guides to act on the skin of the animal a little in advance of the blades and regulate the pressure of the blades thereon to prevent cutting or scraping off the skin. This roller or cylinder is provided with a groove, D, at each end, by which a belt, E, may be applied from a counter-shaft above to drive it, the counter-shaft being mounted on a frame, by which it can be shifted high or low, as the scraper requires to be raised or lowered, or shifted laterally in conformity with the shape of the animal. F represents handles, one at each end, on which the cylinder will be mounted so as to revolve when it is turned by a belt, E, but which may be so as to turn with the cylinder in case it is to be driven by a jointed sectional shaft, G, such as represented in the drawing, coupled to it at the end, the shaft being driven by a pulley, H, in which a section, I, slides to allow the scraper to move laterally, it being moved to the left by the operator, and to the right by a weight, I, and cord J, the cord working over a pulley, L, or any other suitable apparatus.

The sectional jointed shaft G is used to allow of turning the scraper out of a right line with the shaft, as necessary to work over the irregular surface of the animal.

The sections of the shaft may be connected by links, or hooks and eyes, as here shown, or by balls and sockets, as may be preferred.

In case the scraper is to be rotated by a belt, E, the belt may pass between guide-rollers M fixed in a block, N, fixed a short distance above to guide the belt when it is required to hold the scraper vertically, or thereabout.

I do not limit myself to any particular arrangement of driving apparatus for actuating the scraper; but propose to make use of any by which it can be revolved while being shifted and changed as required, to apply it so as to act upon the carcass of a hog, as necessary, while being held by the hands of the attendant.

Good results may be had with a scraper of this character without the guides B, if very carefully handled; but it will be better to make use of them.

Having thus described my invention, I claim as new and desire to secure by Letters Patent—

A rotary scraping or scuttling instrument with blades C, handles F, and apparatus adapted to rotate it while being held in the hands of an attendant and applied to the carcass of a hog, the blades being adapted for scraping off the hairs when so applied and operated, all substantially as specified.

ROBERT FYFE.

Witnesses:
C. SEDGWICK,
T. B. MOSHER.